(12) United States Patent
Takada (10) Patent No.: US 9,982,460 B2
(45) Date of Patent: May 29, 2018

(54) ELECTRIC LOCK

(71) Applicant: NTN CORPORATION, Osaka (JP)

(72) Inventor: Seiichi Takada, Mie (JP)

(73) Assignee: NTN CORPORATION, Osaka (JP)

(*) Notice: Subject to any disclaimer, the term of this patent is extended or adjusted under 35 U.S.C. 154(b) by 0 days. days.

(21) Appl. No.: 15/532,307

(22) PCT Filed: Nov. 16, 2015

(86) PCT No.: PCT/JP2015/082095
§ 371 (c)(1),
(2) Date: Jun. 1, 2017

(87) PCT Pub. No.: WO2016/088542
PCT Pub. Date: Jun. 9, 2016

(65) Prior Publication Data
US 2017/0328086 A1 Nov. 16, 2017

(30) Foreign Application Priority Data

Dec. 2, 2014 (JP) .................................. 2014-243763
Jul. 7, 2015 (JP) .................................. 2015-135942

(51) Int. Cl.
E05B 47/00 (2006.01)
E05B 15/00 (2006.01)

(52) U.S. Cl.
CPC ........ *E05B 47/0001* (2013.01); *E05B 15/006* (2013.01); *E05B 2047/0014* (2013.01); *E05B 2047/0084* (2013.01)

(58) Field of Classification Search
CPC ............... E05B 47/0001; E05B 15/006; E05B 2047/0014; E05B 2047/0084

(Continued)

(56) References Cited

U.S. PATENT DOCUMENTS

| 4,438,962 A | * | 3/1984 | Soloviff | .............. E05B 47/0012 |
| | | | | 292/144 |
| 5,040,652 A | * | 8/1991 | Fish | .................... E05B 17/0058 |
| | | | | 192/71 |

(Continued)

FOREIGN PATENT DOCUMENTS

| JP | 9-177403 | 7/1997 |
| JP | 2003-294060 | 10/2003 |

(Continued)

OTHER PUBLICATIONS

International Search Report dated Feb. 2, 2016 in corresponding International (PCT) Application No. PCT/JP2015/082095.

(Continued)

*Primary Examiner* — Lloyd A Gall
(74) *Attorney, Agent, or Firm* — Wenderoth, Lind & Ponack, L.L.P.

(57) ABSTRACT

An electric lock includes an input switching clutch for selectively transmitting electric or manual driving force to an output line. The input switching clutch includes an outer ring that rotates together with an electrically driven input gear, and an inner ring which rotates together with an output gear. Wedge-shaped spaces are defined between the outer ring and the inner ring. Two rollers are mounted in each wedge-shaped space and are biased toward narrow portions of the wedge-shaped space by a coil spring also mounted in the wedge-shaped space. The input switching clutch further includes an unlocking piece having crossbars inserted at both circumferential ends of the respective wedge-shaped spaces, and coupled to a manually driven input shaft so that rotation of the manually driven input shaft can be transmitted thereto; and a torque transmission mechanism for transmitting the rotation of the manually driven input shaft to the inner ring.

6 Claims, 6 Drawing Sheets

(58) Field of Classification Search
USPC ......... 70/149, 472, 218, 222, 223, 422, 386, 70/277, 278.3, 278.7, 279.1, 280–283, 70/283.1; 292/142, 144
See application file for complete search history.

(56) References Cited

U.S. PATENT DOCUMENTS

| | | | | |
|---|---|---|---|---|
| 5,857,365 | A * | 1/1999 | Armstrong | E05B 47/0012 292/142 |
| 6,598,909 | B2 * | 7/2003 | Lu | E05B 47/0012 292/144 |
| 8,210,580 | B2 * | 7/2012 | Engel | E05B 15/0053 292/252 |
| 8,621,900 | B2 * | 1/2014 | Wu | E05B 47/0012 292/142 |
| 9,051,762 | B2 * | 6/2015 | Huang | E05B 47/0012 |
| 2001/0003913 | A1 * | 6/2001 | Engler | E05B 47/0692 70/277 |
| 2005/0092046 | A1 * | 5/2005 | Errani | E05B 47/0692 70/283 |
| 2013/0167598 | A1 * | 7/2013 | Huang | E05B 47/0012 70/278.1 |
| 2016/0102478 | A1 * | 4/2016 | Schneider | E05B 65/1046 49/506 |

FOREIGN PATENT DOCUMENTS

| | | |
|---|---|---|
| JP | 2005-76785 | 3/2005 |
| JP | 4847266 | 11/2011 |
| JP | 2013-83314 | 5/2013 |

OTHER PUBLICATIONS

International Preliminary Report on Patentability dated Jun. 6, 2017 in corresponding International (PCT) Application No. PCT/JP2015/082095.

* cited by examiner

ELECTRIC LOCK

TECHNICAL FIELD

The present invention relates to an electric lock which can be locked and unlocked both electrically and manually.

BACKGROUND ART

Smart homes are increasing these days which are equipped with many electrically controlled moving parts. For example, such smart homes are typically equipped with an electric lock mounted to the entrance door to allow the entrance door to be locked and unlocked without using a key. It is required that an electric key mounted to an entrance door be not only electrically locked and unlocked, but manually locked and unlocked using a conventional key in case of an emergency such as a power outage.

JP Patent 4847266 discloses one of electric locks which can be locked and unlocked both electrically and manually. The electric lock disclosed in JP Patent 4847266 includes clutch gear driven by a motor, and three clutch members (a first clutch piece, a second clutch piece, and a locking piece) mounted inside the clutch gear and rotatably fitted on a fixed clutch shaft while being superimposed on each other in the axial direction. When an electric driving force is applied, the clutch gear and the clutch members become locked together, and the clutch members engage a drive arm, so that the drive arm drives a dead bolt through a manually driven input member (tumbler) to which a manual force is applied from a key or a thumb turn, thereby locking or unlocking the electric lock. When a manual driving force is applied, the clutch gear and the clutch members are unlocked from each other by the drive arm, which is operatively coupled to the manually driven input member, and simultaneously, the manually driven input member drives the dead bolt, thus locking or unlocking the electric lock.

Of the three clutch members of the electric lock disclosed in JP Patent 4847266, the second clutch piece is a fan-shaped member having engaged portions at the circumferential ends thereof which is configured to engage one end of the drive arm. Wedge-shaped spaces are defined between the outer peripheral surface of the second clutch piece and the inner peripheral surface of the clutch gear, and a roller is received in each wedge-shaped space so that when the roller in at least one of the wedge-shaped spaces is wedged into a narrow portion the wedge-shaped space, the clutch gear and the second clutch piece become locked together.

Since the second clutch piece is a fan-shaped member, the rollers, through which the clutch gear and the second clutch piece are locked together, cannot be arranged at uniform intervals over the entire circumference of the clutch gear. Their number is small, too, compared with the number of rollers arranged uniformly over the entire circumference (only two rollers are used in the embodiment, of which one slips when the other locks up).

Thus, when the clutch gear and the second clutch piece become locked together, high surface pressures are applied from the rollers. This could result in premature wear of the inner peripheral surface of the clutch gear and the outer peripheral surface of the second clutch piece during use of the electric lock, i.e., deformation of the wedge-shaped spaces, to such an extent that the clutch gear and the second clutch piece cannot be properly locked together, thereby making it impossible to electrically lock and unlock the electric lock. While the clutch gear and the second clutch piece are locked together, the roller that is wedged into a narrow portion of the wedge-shaped space presses the second clutch piece against the clutch shaft, causing the second clutch piece to rotate while in sliding contact with the clutch shaft, so that the rotation torque of the second clutch piece could increase to such an extent that the electric lock cannot be electrically locked and unlocked smoothly. Also, driving torque tends to fluctuate due to uneven wear of the outer peripheral surface of the clutch shaft and the inner peripheral surface of the clutch shaft fitting hole of the second clutch piece, and/or due to decentering of the clutch shaft.

SUMMARY OF THE INVENTION

Object of the Invention

An object of the present invention is to provide an electric lock which can be locked and unlocked both electrically and manually, and which can be used stably over a prolonged period of time.

Means for Achieving the Object

In order to achieve this object, the present invention provides an electric lock comprising:

a first input member configured to be rotationally driven under an electric driving force from a driving motor;

a second input member configured to be rotationally driven under a manual driving force from one of a key and a thumb turn;

an output member configured to move a dead bolt forward and backward;

a reverse input blocking mechanism configured to allow transmission of the electric driving force from the driving motor to the first input member, and to lock up when reverse input torque is applied to the first input member, thereby keeping the first input member stationary; and an input switching clutch configured to selectively transmit either one of the electric driving force applied to the first input member and the manual driving force applied to the second input member, to the output member, whereby the electric lock can be locked and unlocked with either of the electric driving force and the manual driving force, wherein the input switching clutch includes:
  an outer ring configured to rotate together with the first input member;
  an inner ring provided radially inwardly of the outer ring, and configured to rotate about a rotation axis of the second input member together with the output member; and
  a plurality of rollers between the outer ring and the inner ring,
  wherein the input switching clutch is configured such that when the electric driving force is applied to the first input member, the outer ring becomes locked to the inner ring through the rollers so that the electric driving force is transmitted to the inner ring and the output member, and such that when the manual driving force is applied to the second input member, and the second input member is rotated under the manual driving force, the outer ring and the inner ring are unlocked from each other first, and thereafter, the manual driving force is transmitted to the inner ring and the output member.

With this arrangement, since the input switching clutch for transmitting the electric driving force or the manual driving force to the output member is configured such that a plurality of rollers for locking together the outer ring, which rotates under the electric driving force together with the first input member, and the inner ring, which rotates together with the output member, can be arranged between the outer ring and the inner ring in a balanced manner in the circumferential direction so that when the outer ring and the inner ring are locked together, the surface pressures applied from the rollers are low. This reduces the possibility of premature or uneven wear of the inner periphery of the outer ring and the outer peripheral surface of the inner ring, and/or decentering of the inner ring, during use of the electric lock.

In a specific arrangement of the input switching clutch, the inner ring of the input switching clutch has an outer periphery including a plurality of circumferentially arranged cam surfaces, and the outer ring of the input switching clutch has a cylindrical inner peripheral surface, to define, between each of the cam surfaces of the inner ring and the cylindrical inner peripheral surface, a wedge-shape space which narrows gradually toward respective circumferential ends thereof, and in which two of the rollers and a spring are mounted such that the rollers are pushed by the spring into respective narrow circumferential end portions of the wedge-shaped space;

the input switching clutch further includes an unlocking piece having crossbars inserted on both circumferential sides of the respective wedge-shaped spaces, and coupled to the second input member such that rotation can be transmitted to the second input member, and a torque transmission means between the second input member and the inner ring, and configured such that rotation of the second input member is transmitted to the inner ring through the torque transmission means with a slight angular delay; and the input switching clutch is configured such that when the electric driving force is applied to the first input member, the outer ring, which is configured to rotate together with the first input member, becomes locked to the inner ring through the rollers so that the electric driving force is transmitted to the inner ring and the output member, and such that when the manual driving force is applied to the second input member, one of the two rollers in each of the wedge-shaped spaces, which are opposed to each other in a rotational direction, is pushed toward a wide portion of the wedge-shaped space by the corresponding one of the crossbars of the unlocking piece, which is configured to rotate together with the second input member, against an elastic force of the spring in the wedge-shaped space so that the outer ring and the inner ring are unlocked from each other, and thereafter, the manual driving force is transmitted to the inner ring and the output member through the torque transmission means.

The reverse input blocking mechanism may be a worm gear mechanism including a worm gear configured such that the electric driving force from the driving motor is applied to the worm gear, and a worm wheel meshing with the worm gear and coupled to the first input member such that rotation can be transmitted to the first input member, and having a self-locking function.

Advantages of the Invention

With this arrangement, as described above, since the input switching clutch for transmitting the electric driving force or the manual driving force to the output member is configured such that a plurality of rollers for locking together the outer ring, which rotates under the electric driving force together with the first input member, and the inner ring, which rotates together with the output member, can be arranged between the outer ring and the inner ring in a balanced manner in the circumferential direction, the outer ring and the inner is less likely to become worn prematurely and/or unevenly, and the inner ring is less likely to become out of alignment. Thus, the electric lock according to the present invention can be stably locked and unlocked over a prolonged period of time, compared with conventional electric locks including a clutch mechanism which severely restricts the arrangement and the number of rollers.

BEST MODE FOR EMBODYING THE INVENTION

Figure 1:
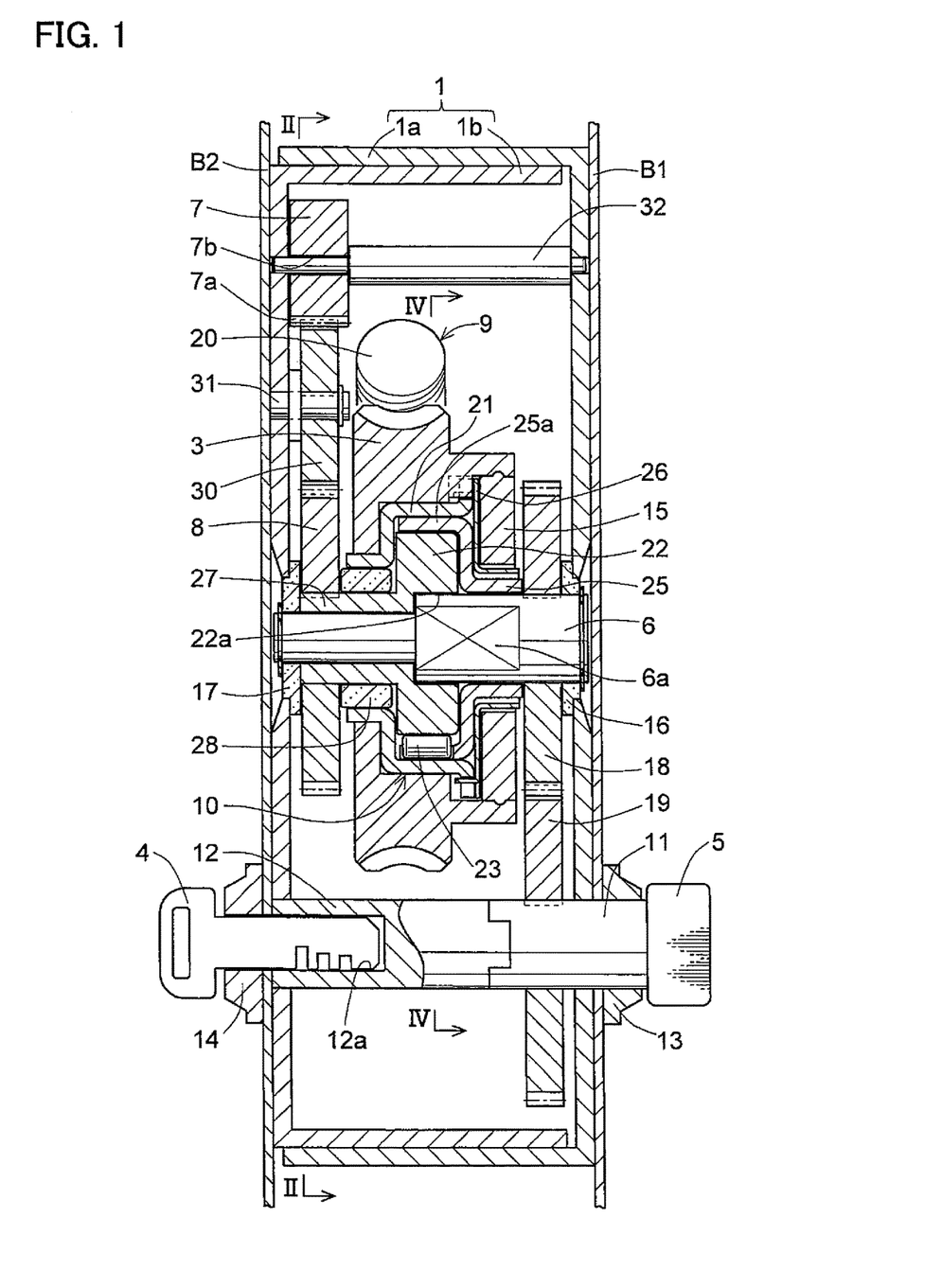
FIG. 1 is a vertical sectional front view of an electric lock embodying the present invention.
Figure 2:
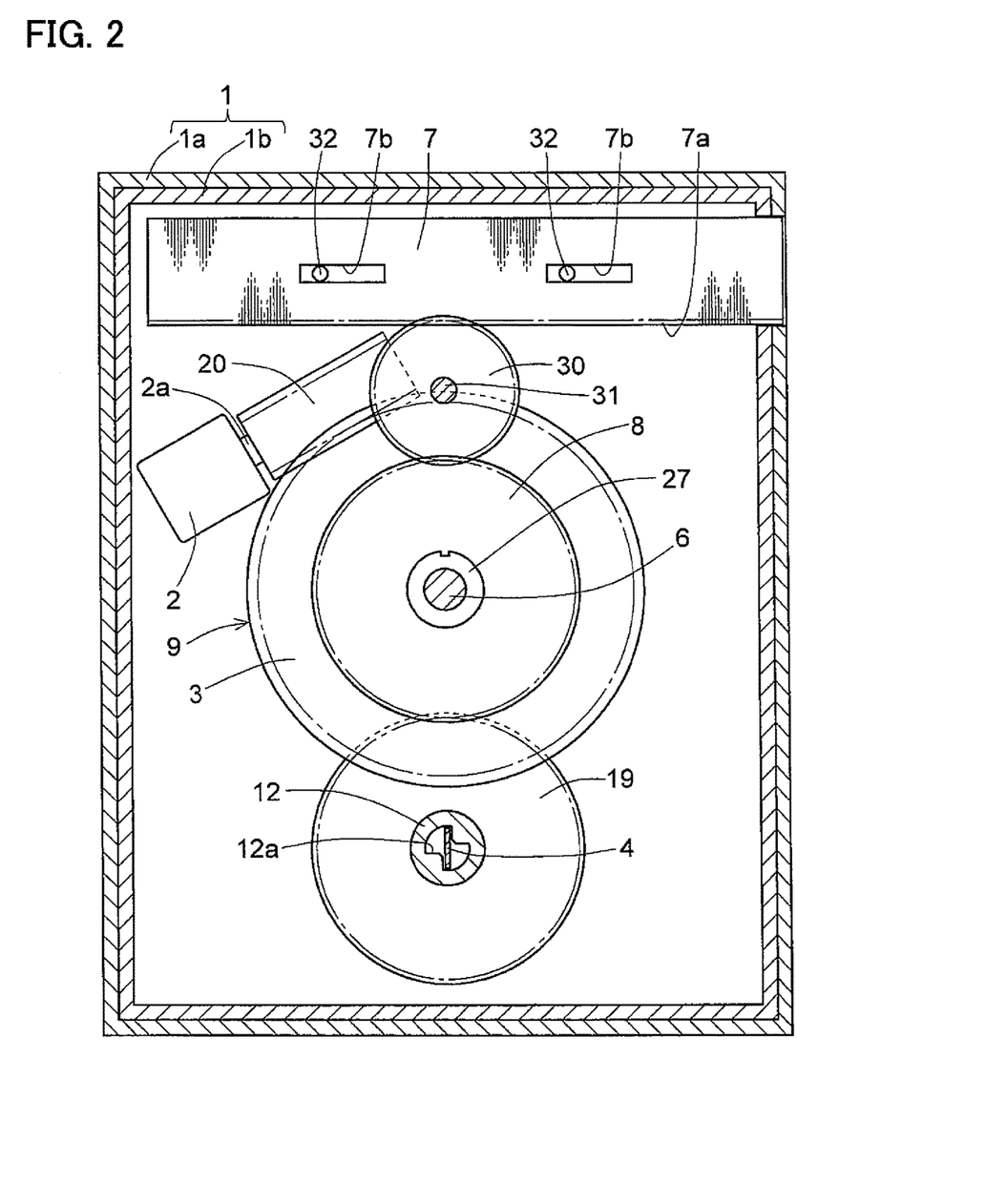
FIG. 2 is a sectional view taken along line II-II of FIG. 1.

Now referring to FIGS. 1-5B, the electric lock embodying the present invention is described. As shown in FIGS. 1 and 2, this electric lock includes, mounted inside a lock case 1 fixedly inserted between a pair of plate members B1 and B2 defining the outer and inner surfaces of an entrance door of a house: a driving motor 2; an electrically driven input gear (first input member) 3 configured to be rotationally driven under the electric driving force from the driving motor 2; a manually driven input shaft (second input member) 6 configured to be rotationally driven under a manual driving force from a key 4 or a thumb turn 5; an output gear (output member) 8 configured to move a dead bolt 7 forward and backward; a worm gear mechanism 9 located between the driving motor 2 and the electrically driven input gear 3, as a reverse input blocking mechanism; and an input switching clutch 10 coupled to the electrically driven input gear 3, the manually driven input shaft 6, and the output gear 8, and configured to selectively transmit either one of the electric driving force and the manual driving force to the output gear 8. Thus, this electric lock can be locked and unlocked either under the electric driving force or under the manual driving force.

The lock case 1 comprises an outer box 1a which is open on the side of the key 4, and an inner box 1b which is open on the side of the thumb turn 5 and nested in the outer box 1a. A thumb turn shaft 11 which is integral with the thumb turn 5 extends through the outer box 1a and the plate member B1, which defines the inner surface of the door. The thumb turn shaft 11 is coupled to one end of the key shaft 12 into which the distal end portion of the key 4 can be inserted such that rotation can be transmitted to the key shaft 12. The key shaft 12 is rotatably supported at its other end by the inner box 1b. A thumb turn seat 13 is mounted to the surface of the plate member B1 to rotatably support the thumb turn shaft 11. A key seat 14 is mounted to the surface of the plate member B2, which defines the outer surface of the door, such that the tip of the key 4 can be inserted through the key seat 14 and the plate member B2 into the key shaft 12.

Figure 3A:
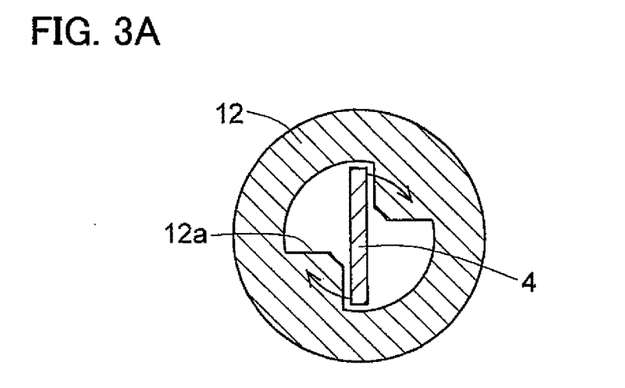
FIG. 3A illustrates how the electric lock of FIG. 1 is locked and unlocked with a key.
Figure 3B:
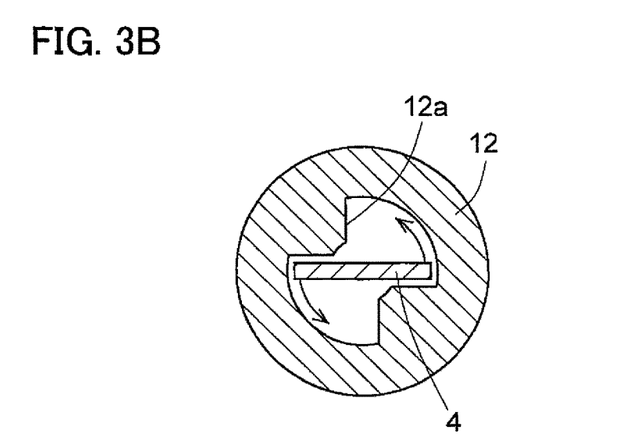
FIG. 3B illustrates how the electric lock of FIG. 1 is locked and unlocked with the key.

The key shaft 12 has a key hole 12a into which the tip of the key 4 is inserted and which comprises, as shown in FIG. 2, two diametrically opposed recesses each having a fan-shaped cross-section. In the state of FIG. 2, i.e., when one of the fan-shaped recesses is at the upper left portion of the key shaft 12, and the other fan-shaped recess is at the lower right portion of the key shaft 12, the electric lock is in the unlocked state. When, from this unlocked state, the key 4, while being inserted in the key shaft 12, is turned clockwise as shown by the arrows in FIG. 3A, the key shaft 12 is pushed by the key 4, and turned clockwise, and when the key shaft 12 is turned to the position shown in FIG. 3B, where the one fan-shaped recess is at the upper right portion of the key shaft 12, and the other fan-shaped recess is at the lower left portion of the key shaft 12, the electric lock is locked. The key seat 14 is configured such that the key 4 can be passed through the key seat 14 only while, as shown in FIG. 3A, the tip of the key 4 extends vertically, as viewed in its cross-section. Thus, after locking the electric lock with the key 4, the key 4 is turned in reverse (counterclockwise) as shown by the arrows in FIG. 3B to the original position (shown in FIG. 3C), and in this state, the key 4 is pulled out of the key shaft 12 and the key seat 14.

Figure 3C:
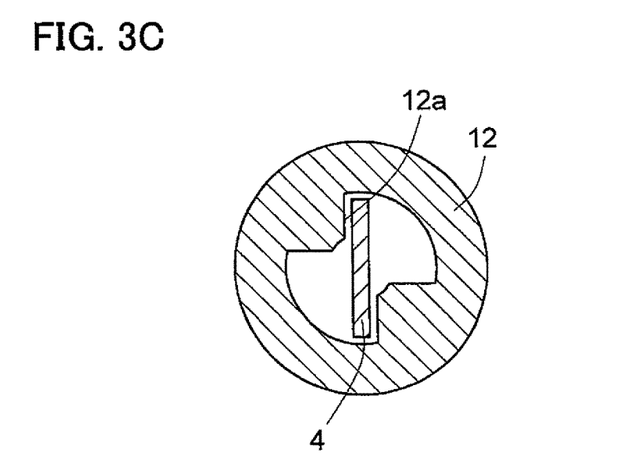
FIG. 3C illustrates how the electric lock of FIG. 1 is locked and unlocked with the key.
Figure 3D:
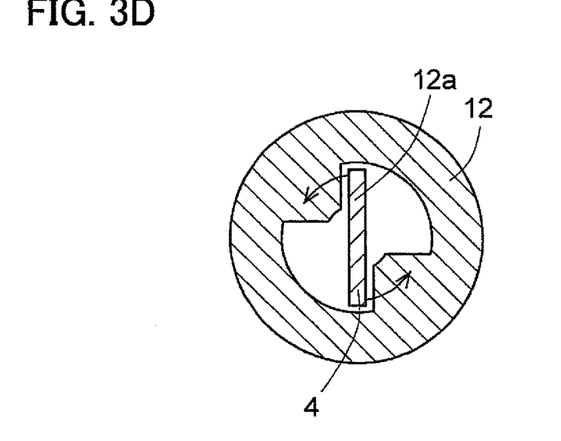
FIG. 3D illustrates how the electric lock of FIG. 1 is locked and unlocked with the key.
Figure 3E:
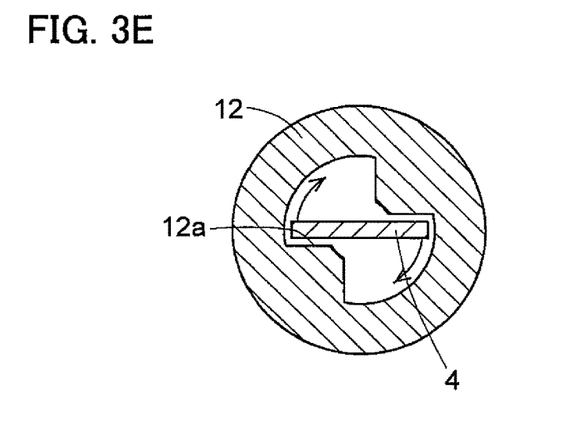
FIG. 3E illustrates how the electric lock of FIG. 1 is locked and unlocked with the key.
Figure 3F:
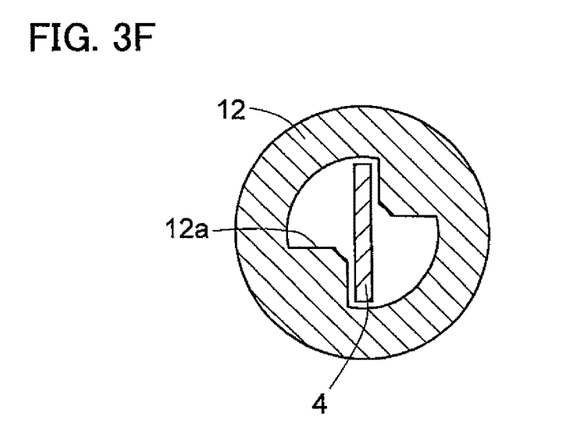
FIG. 3F illustrates how the electric lock of FIG. 1 is locked and unlocked with the key.

When, in the state of FIG. 3C, the key 4 is turned counterclockwise (as shown by the arrows of FIG. 3D), the key shaft 12 is pushed by the key 4, and is turned counterclockwise to the position of FIG. 3E, where the electric lock is unlocked. When the electric lock is unlocked with the key 4 too, the key 4 is turned in reverse (clockwise) to the original position (shown in FIG. 3F), and in this state, the key 4 is pulled out of the key shaft 12 and the key seat 14.

The electrically driven input gear 3 is a worm wheel which is, as will be described below, an element of the worm gear mechanism 9, and is configured such that the input switching clutch 10 can be placed into the worm wheel through an opening at one axial end of the worm wheel. This opening is closed by a lid 15.

The manually driven input shaft 6 has a large-diameter portion including one end of the manually driven input shaft 6, and is supported at the respective end portions thereof by the outer box 1a and the inner box 1b of the lock case 1 through sintered oil-containing bearings 16 and 17. The large-diameter portion includes, at its portion connected to the small-diameter portion of the manually driven input shaft 6, a flat surfaced section 6a having two opposite flat surfaces. In the manner described below, the driving force is transmitted to the output side through the flat surfaced section 6a. A manual input gear 18 is fixed by keys to the outer periphery of the large-diameter portion of the manually driven input shaft 6 between the flat surfaced section 6a and the sintered oil-containing bearing at the one end of the manually driven input shaft 6 such that the manual input gear 18 meshes with a thumb turn gear 19 fixed by keys to the outer periphery of the thumb turn shaft 11. Thus, the manually driven input shaft 6 is rotationally driven under the manual input force from the key 4 or from the thumb turn 5.

The worm gear mechanism 9 comprises a worm gear 20 connected to the rotary shaft 2a of the driving motor 2 so that the driving force from the driving motor 2 is directly applied to the worm gear 20, and the electrically driven input gear 3 in the form of a worm wheel meshing with the worm gear 20. The worm gear mechanism 9 has a self-locking function. That is, the worm gear mechanism 9 is configured to transmit the driving force of the driving motor 2 to the electrically driven input gear 3, and to lock up, thereby stopping the electrically driven input gear 3, when reverse input torque is applied to the electrically driven input gear 3 from the output side.

Figure 4:
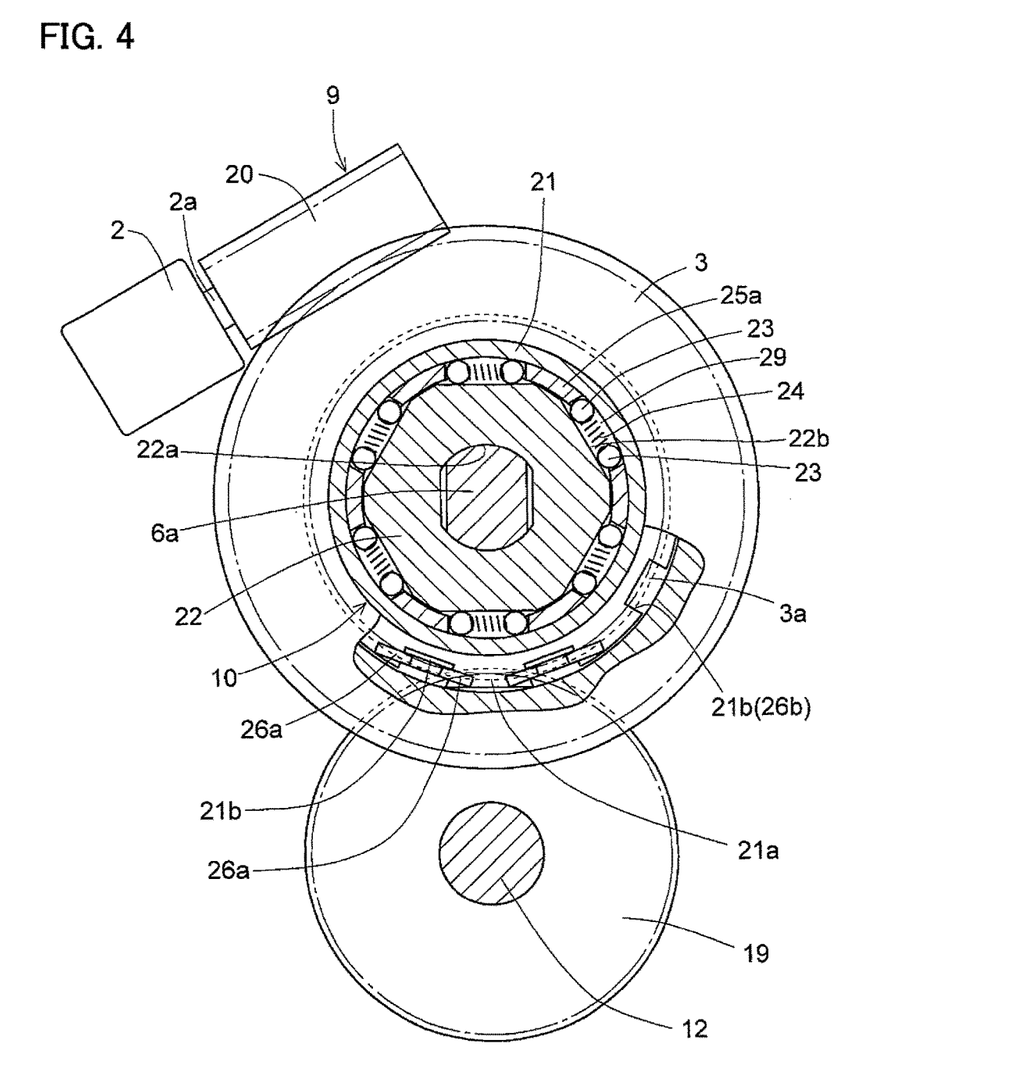
FIG. 4 is a sectional view taken along line IV-IV of FIG. 1.

As shown in FIGS. 1 and 4, the input switching clutch 10 includes an outer ring 21 having a large-diameter cylindrical portion and a small-diameter cylindrical portion; an inner ring 22 located radially inwardly of the large-diameter cylindrical portion of the outer ring 21; rollers 23 and coil springs 24 disposed between the inner peripheral surface of the large-diameter cylindrical portion of the outer ring 21 and the outer peripheral surface of the inner ring 22; an unlocking piece 25 having crossbars 25a each inserted between the outer ring 21 and the inner ring 22 on the opposite side of a roller 23 from the coil spring 24; and a side plate 26 disposed between the unlocking piece 25 and the lid 15 of the electrically driven input gear 3, and mounted to the outer ring 21.

The outer ring 21 of the input switching clutch 10 has a flange 21a at one end of the outer ring 21. The flange 21a includes, in its outer peripheral portion, a plurality of cutouts 21b. The side plate 26 has, on its outer peripheral portion, claws 26a which are fitted, respectively, in some of the cutouts 21b and bent such that the side plate 26 is fixed to the flange 21a by the claws 26a. The electrically driven input gear 3 has, on its inner periphery, anti-rotation protrusions 3a fitted in the respective remaining cutouts 21b of the flange 21a, and in respective cutouts 26b formed in the side plate 26 at positions corresponding to the respective remaining cutouts 21b such that the outer ring 21 and the side plate 26 rotate together with the electrically driven input gear 3.

The flat surfaced section 6a of the manually driven input shaft 6 is inserted in an engaging hole 22a formed in the one end of the inner ring 22, and the small-diameter portion of the manually driven input shaft 6 extends through a hollow output shaft 27 integrally connected to the other end of the inner ring 22 so that the inner ring 22 rotates about the axis about which the manual input shaft 6 rotates. The output shaft 27 is rotatably supported by a sintered oil-containing bearing 28 fitted in the inner periphery of the small-diameter cylindrical portion of the outer ring 21. The output gear 8 is fixed by keys to the outer periphery of the output shaft 27 between the sintered oil-containing bearing 28 and the sintered oil-containing bearing 17, which supports the other end portion of the manually driven input shaft 6, so that the inner ring 22 and the output shaft 27 rotate together with the output gear 8.

The engaging hole 22a of the inner ring 22 has substantially the same cross-sectional shape as the flat surfaced section 6a of the manually driven input shaft 6, and faces the flat surfaced section 6a with a small rotational gap left therebetween. Thus, the engaging hole 22a of the inner ring 22 and the flat surfaced section 6a of the manually driven input shaft 6 constitute a torque transmission mechanism through which the rotation of the manually driven input shaft 6 is transmitted to the inner ring 22 with a slight angular delay.

The inner ring 22 has, on its outer periphery, a plurality of cam surfaces 22b extending perpendicular to the radial direction of the inner ring 22 so that a wedge-shaped space 29 which gradually narrows toward the respective circumferential ends thereof is defined between each cam surface 22b and the inner cylindrical surface of the outer ring 21. A pair of the rollers 23 and one of the coil springs 24 are received in each wedge-shaped space 29 with the coil spring 24 disposed between the pair of rollers 23 so that the pair of rollers 23 is pushed toward the respective narrow ends of the wedge-shaped space 19 by the coil spring 24. Two of the crossbars 25a of the unlocking piece 25 are located at the respective circumferential ends of each wedge-shaped space 29. The unlocking piece 25 is fixedly fitted to the outer periphery of the flat surfaced section 6a of the manually driven input shaft 6 at the one end portion of the flat surfaced section 6a, with no gap left therebetween.

When input torque (driving force) is applied, through the electrically driven input gear 3, to the outer ring 21 of the input switching clutch 10, the rotationally forward rollers 23 are wedged into the rotationally forward narrow circumferential ends of the respective wedge-shaped spaces 29 under the biasing force of the coil springs 24, so that the outer ring 21 and the inner ring 22 become locked together through the rotationally forward rollers 23. As a result, the rotation of the outer ring 21 is transmitted to the inner ring 22, the output shaft 27, and the output gear 8. Since the crossbars 25a of the unlocking piece 25 are pushed by the rotationally forward rollers 23 at that time, the manually driven input shaft 6, to which the unlocking piece 25 is fixed, and the manually driven input gear 18 are also rotated together with the outer ring 21.

Figure 5A:
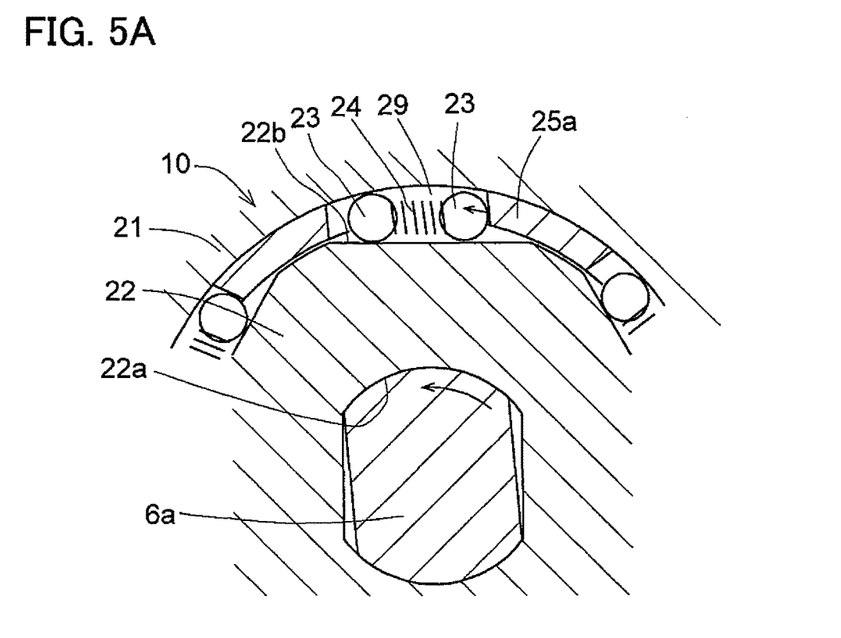
FIG. 5A illustrates how rotation is transmitted in the electric lock of FIG. 1 when a manual input is applied to the electric lock.
Figure 5B:
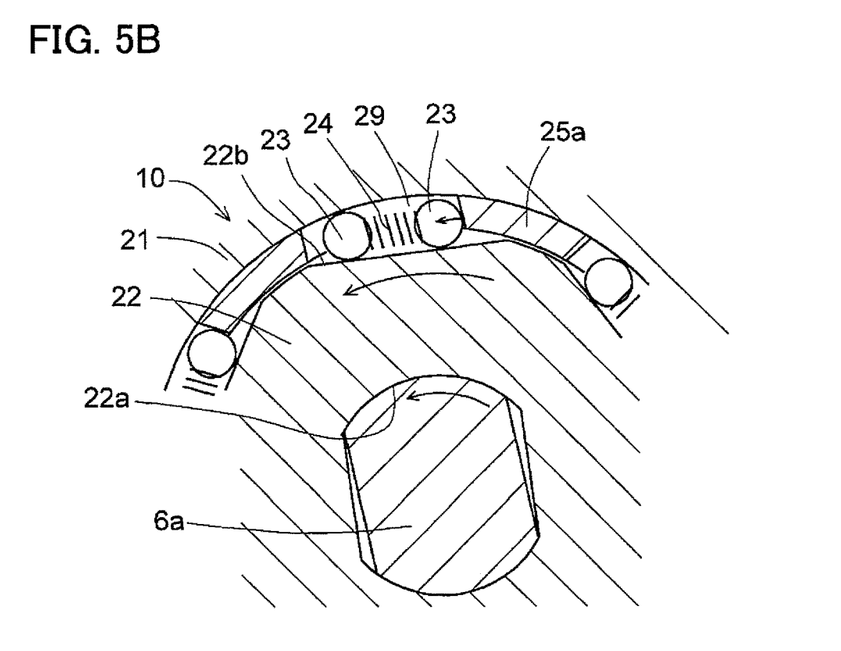
FIG. 5B illustrates how rotation is transmitted in the electric lock of FIG. 1 when a manual input is applied to the electric lock.

When input torque (driving force) is applied to the manually driven input shaft 6 through the manually driven input gear 18, as shown in FIG. 5A, the crossbars 25a of the unlocking piece 25, which is rotating together with the manually driven input shaft 6, push the rotationally rearward rollers 23 (i.e., the rollers opposed to the respective crossbars 25a in the rotational direction), against the elastic forces of the coil springs 24, into the wider portions of the wedge-shaped spaces 29. This causes the rotationally rearward rollers 23 to become disengaged from the outer ring 21 and the inner ring 22, thus unlocking the outer ring 21 and the inner ring 22 from each other. When the manually driven input shaft 6 rotates further in this state, the flat surfaced section 6a of the large-diameter portion of the manually driven input shaft 6 pushes the inner surface of the engaging hole 22a of the inner ring 22, so that, as shown in FIG. 5B, the rotation of the manually driven input shaft 6 is transmitted to the inner ring 22. This causes the rotationally forward rollers 23 to become disengaged from the outer ring 21 and the inner ring 22. As a result, the inner ring 22 and the output shaft 27 rotate together with the output gear 8.

If input torques are applied simultaneously to both the outer ring 21 and the manually driven input shaft 6, the unlocking piece 25, which is fixed to the manually driven input shaft 6, unlocks the outer ring 21 and the inner ring 22 from each other, thus preventing transmission of rotation from the outer ring 21 to the inner ring 22, and allowing transmission of rotation from the manually driven input shaft 6 to the inner ring 22 to rotate the output gear 8. (Thus, in such a situation, the manual input is preferentially transmitted to the inner ring 22,)

The output gear 8 is in mesh with a pinion 30 meshing with a rack portion 7a of the dead bolt 7, on the opposite side of the pinion 30 from the dead bolt 7. The pinion 30 is rotatably supported on a support shaft 31 fixed to the inner box 1b of the lock case 1. The dead bolt 7 is formed with two longitudinally spaced apart, longitudinally elongated guide holes 7b. Two guide shafts 32 each having a small-diameter portion extending through one of the guide holes 7b are each supported at the respective ends thereof by the outer box 1a and the inner box 1b of the lock case 1. Thus, when the output gear 8 rotates, one end of the dead bolt 7 protrudes out of, or retracts into, the lock case 1 with the dead bolt 7 guided by the small-diameter portions of the guide shafts 32.

Now the operation of this electric lock is described. When the driving motor 2 is activated by an electrical signal from outside, the driving force from the driving motor 2 is applied through the worm gear mechanism 9 to the electrically driven input gear 3, and then transmitted to the output gear 8 by the action of the input switching clutch 10, rotating the output gear 8. When the output gear 8 rotates, the dead bolt 7 is moved in the longitudinal direction such that the one end of the dead bolt 7 either protrudes out of, or retracts into, the lock case, thus locking or unlocking the electric lock.

At that time, since the manually driven input shaft 6 and the manually driven input gear 18 also rotate together with the electrically driven input gear 3 by the action of the input switching clutch 10, the rotation of the electrically driven input gear 3 is also transmitted to the thumb turn gear 19, so that the thumb turn shaft 11 and the thumb turn 5 (as well as the key shaft 12, coupled to the thumb turn shaft 11) rotate together with the thumb turn gear 19. This makes it possible for a user to confirm that the electric lock has been locked or unlocked under the electric driving force by visually checking the thumb turn 5 from inside the entrance door.

In order to lock and unlock the electric lock with the key 4, the tip of the key 4 is inserted through the key seat 14 into the key shaft 12, and the key 4 is turned clockwise (locked position), or counterclockwise (unlocked position). As a result, the driving force from the key 4 is applied to the manually driven input shaft 6 through the key shaft 12, thumb turn shaft 11, thumb turn gear 19, and manually driven input gear 18, and then transmitted to the output gear 8 by the action of the input switching clutch 10, rotating the output gear 8. The rotation of the output gear 8 causes the dead bolt 7 to move longitudinally, thereby locking or unlocking the electric lock, in the same manner as when the driving motor 2 is activated. By turning the thumb turn 5 counterclockwise (when the electric lock is seen from the side of the thumb turn 5), the electric lock is locked, and by turning the thumb turn 5 clockwise, the electric lock is unlocked, in the same manner as when the key 4 is turned.

When the key 4 or the thumb turn 5 is turned, since the electrically driven input gear 3 and the outer ring 21 remain stationary by the action of the worm gear mechanism 9, the driving force from the key 4 or the thumb turn 5 can be smoothly transmitted through the input switching clutch 10. That is, this electric lock allows the key 4 and the thumb turn 5 to be operated with a light force to manually lock and unlock the electric lock.

As described above, this electric lock can be smoothly locked and unlocked with the electric driving force from the driving motor, or with the manual driving force from the key 4 or the thumb turn 5, by the action of the input switching clutch 10. Since the input switching clutch 10 is designed such that a plurality of rollers 23 can be circumferentially spaced apart from each other in a balanced manner between the outer ring 21, which rotates together with the electrically driven input gear 3 under the electric driving force, and the inner ring 22, which rotates together with the output gear 8, so as to selectively lock the outer ring 21 and the inner ring 22 to each other, the surface pressures applied to the outer ring 21 and the inner ring 22 from the rollers 23 are low when the outer ring 21 and the inner ring 22 are locked together through the rollers 23. This in turn reduces premature and/or uneven wear of the inner peripheral surface of the outer ring 21 and the outer peripheral surface of the inner ring 22 during use, thus reducing the possibility of decentering of the inner ring 22. Thus, compared with conventional electric locks which include a clutch mechanism of which the positions and the number of the rollers are severely restricted, the electric lock according to the present invention can be locked and unlocked stably over a prolonged period of time.

The input switching clutch according to the present invention is not limited to that of the above embodiment, provided that the input switching clutch according to the present invention includes an outer ring configured to rotate together with the first input member, an inner ring provided radially inwardly of the outer ring, and configured to rotate about the rotation axis of the second input member together with the output member; and a plurality of rollers between the outer ring and the inner ring, and provided that the input switching clutch is configured such that when a driving force is applied to the first input member, the outer ring becomes locked to the inner ring through the rollers so that the driving force is transmitted to the inner ring and the output member, and when a driving force is applied to the second input member, and the second input member is rotated under this driving force, the outer ring and the inner ring are unlocked from each other first, and thereafter, the second driving force is transmitted to the inner ring and the output member.

While a worm gear mechanism 6 is used in the embodiment as the reverse input blocking mechanism, the reverse input blocking mechanism of the present invention is not limited to a worm gear mechanism, and may be reduction mechanism having a high reduction ratio and having a self-locking function, or one configured to transmit input torque to the output side of the electric lock, and configured to lock up when reverse input torque is applied to the output side, thereby preventing transmission of the reverse input torque.

The electrically driven input gear may comprise the worm wheel of the worm gear mechanism, and a first input member which is a separate member from the worm wheel, and coupled to the worm wheel so that rotation can be transmitted therebetween. Further alternatively, the outer ring of the input switching clutch may be integral with the electrically driven input gear.

While the present invention is directed to an electric lock, the input switching clutch mounted in the electric lock to transmit a driving force can be used for various devices, such as industrial robots, which are actuated both under an electric driving force and a manual driving force.

What is claimed is:

1. An electric lock comprising:
  a first input member configured to be rotationally driven under an electric driving force from a driving motor;
  a second input member configured to be rotationally driven under a manual driving force from one of a key and a thumb turn;
  an output member configured to move a dead bolt forward and backward;
  a reverse input blocking mechanism configured to allow transmission of the electric driving force from the driving motor to the first input member, and to lock up when reverse input torque is applied to the first input member, thereby keeping the first input member stationary; and
  an input switching clutch configured to selectively transmit either one of the electric driving force applied to the first input member and the manual driving force applied to the second input member, to the output member,
  whereby the electric lock can be locked and unlocked with either of the electric driving force and the manual driving force,
  wherein the input switching clutch includes:
    an outer ring configured to rotate together with the first input member;
    an inner ring provided radially inwardly of the outer ring, and configured to rotate about a rotation axis of the second input member together with the output member; and
    a plurality of rollers between the outer ring and the inner ring,
    wherein the input switching clutch is configured such that when the electric driving force is applied to the first input member, the outer ring becomes locked to the inner ring through the rollers so that the electric driving force is transmitted to the inner ring and the output member, and such that when the manual driving force is applied to the second input member, and the second input member is rotated under the manual driving force, the outer ring and the inner ring are unlocked from each other first, and thereafter, the manual driving force is transmitted to the inner ring and the output member.

2. The electric lock of claim 1,
  wherein the inner ring of the input switching clutch has an outer periphery including a plurality of circumferentially arranged cam surfaces, and the outer ring of the input switching clutch has a cylindrical inner peripheral surface, to define, between each of the circumferentially arranged cam surfaces of the inner ring and the cylindrical inner peripheral surface, a wedge-shape space which narrows toward respective circumferential ends thereof, and in which two of the rollers and a spring are mounted such that the rollers are pushed by the spring into respective narrow circumferential end portions of the wedge-shaped space,
  wherein the input switching clutch further includes an unlocking piece having crossbars inserted on both circumferential sides of the respective wedge-shaped spaces, and coupled to the second input member such that rotation can be transmitted to the second input member, and a torque transmission mechanism between the second input member and the inner ring, and configured such that rotation of the second input member is transmitted to the inner ring through the torque transmission mechanism with an angular delay, and
  wherein the input switching clutch is configured such that when the electric driving force is applied to the first input member, the outer ring, which is configured to rotate together with the first input member, becomes locked to the inner ring through the rollers so that the electric driving force is transmitted to the inner ring and the output member, and such that when the manual driving force is applied to the second input member, one of the two rollers in each of the wedge-shaped spaces, which are opposed to each other in a rotational direction, is pushed toward a wide portion of the wedge-shaped space by a corresponding one of the crossbars of the unlocking piece, which is configured to rotate together with the second input member, against an elastic force of the spring in the wedge-shaped space so that the outer ring and the inner ring are unlocked from each other, and thereafter, the manual driving force is transmitted to the inner ring and the output member through the torque transmission mechanism.

3. The electric lock of claim 1, wherein the reverse input blocking mechanism is a worm gear mechanism including a worm gear configured such that the electric driving force from the driving motor is applied to the worm gear, and a worm wheel meshing with the worm gear and coupled to the first input member such that rotation can be transmitted to the first input member, the reverse input blocking mechanism having a self-locking function.

4. The electric lock of claim 2, wherein the reverse input blocking mechanism is a worm gear mechanism including a worm gear configured such that the electric driving force from the driving motor is applied to the worm gear, and a worm wheel meshing with the worm gear and coupled to the first input member such that rotation can be transmitted to the first input member, the reverse input blocking mechanism having a self-locking function.

5. The electric lock of claim 2, wherein each wedge-shape space narrows gradually toward respective circumferential ends thereof.

6. The electric lock of claim 2, wherein the angular delay is a slight angular delay.

* * * * *